United States Patent Office 3,562,355
Patented Feb. 9, 1971

3,562,355
BLOCK COPOLYMER BLENDS WITH CERTAIN POLYURETHANES OR ETHYLENE-UNSATURATED ESTER COPOLYMERS
Geoffrey Holden, Los Alamitos, Calif., assignor to Shell Oil Company, New York, N.Y.
No Drawing. Filed Mar. 20, 1968, Ser. No. 714,405
Int. Cl. C08g *41/04;* C08f *15/00, 19/00*
U.S. Cl. 260—859
5 Claims

ABSTRACT OF THE DISCLOSURE

Block copolymer compositions are provided having substantially improved physical properties by incorporation of certain polyester urethanes.

BACKGROUND OF THE INVENTION

This invention is concerned with new compositions of matter. More particularly, it pertains to special compositions containing defined block copolymers together with compatible polymers for the improvement in a variety of physical properties.

Block copolymers which exhibit elastomeric properties at ambient temperature and which are thermoplastic at elevated temperature have been developed in recent years from such monomers as styrene and conjugated dienes to form a family of polymers exhibiting the general characteristics of vulcanized rubbers which do not require vulcanization to attain their maximum physical properties. Dependent upon the content of the monomer forming the high glass transition end blocks, e.g., styrene, the properties of these polymers will resemble those of vulcanized rubber or, with increasing styrene content will more nearly resemble improved thermoplastic such as high impact polystyrene or the like. The end uses of these new polymers are diverse and make many stringent demands on their physical properties. For example, in the use of these compounds for shoe components and the like are subjected to flexing it has been found that flex cracking will occur in many instances earlier than is desirable. Moreover, due to the unsaturate nature of at least one of the polymer blocks in the copolymers they are subject to ozonolysis and degradation. It is possible to modify these above-mentioned properties by the incorporation of a wide variety of other polymers but in so modifying the basic copolymer it is usually found to be the case that other physical properties are changed in one undesirable aspect or another.

It is an object of the present invention therefore to provide improved compositions comprising block copolymers modified in such a way as to improve their flex cracking resistance and at the same time to maintain to a large degree the original desirable physical characteristics of these polymers. Furthermore, it is an object of the present invention to provide improved compositions comprising block copolymers and an auxiliary polymer exhibiting substantially improved solvent resistance and ozone resistance. Other objects will become apparent during the following detailed description of the invention.

SUMMARY OF THE INVENTION

Now, in accordance with the present invention, improved compositions exhibiting particularly improved flex cracking resistance and improved resistance to solvent action and ozone are provided comprising a block copolymer as more particularly defined hereinafter together with one or more of three classes of auxiliary polymers, namely, a linear polyester urethane, copolymers of ethylene with esters of terminally ethylenically-unsaturated monocarboxylic acids and saturated aliphatic alcohols and esters of saturated monocarboxylic acids and terminally ethylenically-unsaturated aliphatic alcohols, all as more fully described hereinafter. The present invention is based upon the findings that flex cracking resistance, ozone resistance, cut growth resistance and solvent resistance are all substantially improved in an unpredictable manner while at the same time and just as unpredictably the other physical properties of the block copolymers are not deleteriously affected.

The block copolymers forming the important elastomeric component of the present composition have the general configuration $A(B-A)_n$, wherein $n$ is a whole integer between 1 and 5. If the copolymer is not hydrogenated, the blocks A comprise poly(monovinyl arene) blocks while the block B is a poly(conjugated diene) block. The blocks A normally have average molecular weights as determined by osmotic molecular weight methods as they are related to intrinsic viscosity of between about 8,000 and 45,000, while the conjugated diene polymer block has average molecular weights between about 35,000 and 150,000. Two preferred species of such block copolymers include those having the block configuration polystyrene-polybutadiene-polystyrene and polystyrene-polyisoprene-polystyrene.

Polymers having more complicated structures than the basic three block structure discussed above may be utilized in addition to or in place of the basic structure materials. These may be graft, branched or star-shaped block copolymers in which the individual blocks have the chemical characteristics and average molecular weights discussed hereinbefore. The number of blocks contemplated is not critical as long as there are at least three and preferably 3–8 polymer blocks in the molecule regardless of their specific configuration as long as there are at least two blocks of monovinyl arenes separated by an elastomeric segment.

These particular block copolymers have the unique feature of attaining the stress-strain properties of an elastomer without the requirement that it be subject to curing or vulcanization. Thus, they are sharply differentiated from other rubbers such as natural rubber, polybutadiene, SBR and the like which require vulcanization in order to attain satisfactory stress-strain properties.

The subject block copolymers are modified in accordance with the present invention with one or more of a mixture of three special types of polymers, 100 parts by weight of the block copolymer being so modified with 10–150 parts by weight of the supplementary polymer. Preferably the supplementary polymer is present in an amount between about 15–120 parts by weight per 100 parts of the block copolymer.

The elastomers used in this invention are derived from specific reactants in critical ratios. The elastomers are prepared by reacting 1.0 mol of a hereinafter defined polyester having a molecular weight greater than 600 and less than 1200 with about 1.1 to 3.1 mols of a diphenyl diisocyanate in the presence of about 0.1 to 2.1 mols of a free glycol containing from 4 to 10 carbon atoms. The ratio of free glycol to diphenyl diisocyanate is very critical and the recipe employed must be balanced so that there is essentially no free unreacted diisocyanate or glycol remaining after the reaction to form the elastomer of this invention. The amount of glycol employed will depend upon the molecular weight of the polyester in a manner set forth in detail hereinbelow. After heating the mixture of reactants to form the elastomer, no further treatment is required to develop the outstanding physical properties of the elastomers of this invention.

The polyester preferred for use in this invention is an essentially linear hydroxyl terminated polyester having a molecular weight between 600 and 1200 and an acid number less than about 10. Preferably the polyester has a molecular weight of from about 700 to 1100 and an acid number less than 5. More preferably the polyester has a molecular weight of 800 to 1050 and an acid number less than about 3 in order to obtain a product of optimum physical properties. The molecular weight is determined by assay of the terminal functional groups and is an average molecular weight. The polyester is prepared ordinarily by an esterification reaction of an aliphatic dibasic acid or an anhydride thereof with a glycol. Molar ratios of more than 1 mol of glycol to acid are preferred so as to obtain linear chains containing a preponderance of terminal hydroxyl groups.

The basic polyesters utilized include polyesters prepared from the esterification of such dicarboxylic acids as adipic, succinic, pimelic, suberic, azelaic, sebacic and the like or their anhydrides. Preferred acids are those dicarboxylic acids of the formula HOOC—R—COOH, where R is an alkylene radical containing 2 to 8 carbon atoms. More preferred are those represented by the formula $HOOC(CH_2)_xCOOH$, where $x$ is a number from 2 to 8. Adipic acid is most preferred.

The glycols utilized in the preparation of the polyester by reaction with the aliphatic dicarboxylic acid are preferably straight chain glycols containing between 4 and 10 carbon atoms such as butanediol-1,4, hexamethylenediol-1,6, octamethylenediol-1,8 and the like. In general the glycol is preferably of the formula $HO(CH_2)_xOH$, wherein $x$ is 4 to 8 and the most preferred glycol is butanediol-1,4.

In the preparation of the subject polyurethanes, a free glycol in an amount from about 0.1 to 2.1 mols is present in the polyester prior to reaction with the diphenyl diisocyanate. The free glycol preferably is mixed with the polyester prior to reaction with the diphenyl diisocyanate. Advantage may be taken of residual free glycol in the polyester if the amount is determined by careful analysis. As has been pointed out above, the ratio of free glycol and diphenyl diisocyanate is critical and must be balanced within the limits described hereinafter so that the end reaction product is substantially free of excess isocyanate of hydroxyl groups. The glycol preferred for this purpose is butanediol-1,4. Other glycols which may be employed include the glycols listed above.

The specific diisocyanates employed to react with the mixture of polyester and free glycol are also critical and necessary in order to obtain the outstanding diisocyanate-linked elastomers used in the compositions of this invention. A diphenyl diisocyanate such as diphenyl methane diisocyanate, diphenyl methane - p,p' - diisocyanate, dichlorodiphenyl methane diisocyanate, dimethyl diphenyl methane diisocyanate, diphenyl dimethyl methane diisocyanate, bibenzyl diisocyanate, diphenyl ether diisocyanate and the like are essential. Preferred are the diphenyl methane diisocyanates and best results are obtained from diphenyl methane-p,p'-diisocyanate. When other organic diisocyanates than the diphenyl diisocyanates described above are employed, the novel product of this invention is not obtained.

The amount of reactants employed may be varied from about 1.1 to 3.1 mols of diphenyl diisocyanate per mol of polyester, which polyester contains from about 0.1 to 2.1 mols of glycol, the amount of glycol depending upon the molecular weight of the polyester employed. The amount of diphenyl diisocyanate used is in turn dependent upon the amount of free glycol and polyester and should be an amount equivalent to these latter two reactants so that there are essentially no free unreacted isocyanate and hydroxyl groups remaining in the reaction product. A convenient method for determining how much glycol to add to the polyester prior to reaction of the mixture of polyester and glycol with the diphenyl diisocyanate, to obtain the products of this invention, is to add enough glycol to the polyester so that the mixture has an average hydroxyl number molecular weight of about 450 to 600 and more preferably from 500 to 550. It will be apparent that the higher the molecular weight of the polyester the more glycol that will be required to obtain the desired hydroxyl content in the mixture of free glycol and polyester. Such mixtures should have a hydroxyl number from about 185 to 250 and more preferably from 200 to 225. To this mixture is then added an equivalent amount of a diphenyl diisocyanate which will be between about 1.1 and 3.1 mols of diphenyl diisocyanate and more preferably between about 1.6 and 2.1 mols of diphenyl diisocyanate. Ratios of the three reactants employed to obtain the product of this invention may vary from 1.1 mols of diphenyl diisocyanate, 1.0 mol of polyester and 0.10 mol of free glycol to 3.1 mols of diphenyl diisocyanate, 1.0 mol of polyester and 2.1 mols of free glycol. The amount of diphenyl diisocyanate in each case depends upon the hydroxyl number molecular weight of the polyester and glycol mixture. More preferred are molar ratios of 1.0 mol of polyester and from 1.6 mols of diphenyl diisocyanate and about 0.6 mol of free glycol to 2.1 mols of diphenyl diisocyanate and about 1.1 mols of free glycol. When employing polytetramethylene adipate of molecular weight of 850, the preferred ratio for an elastomer product having optimum physical properties employs about 1.70 mols of diphenyl methane-p,p'-diisocyanate, 1.0 mol of poly(tetramethylene adipate) and about 0.70 mol of butanediol-1,4. When polytetramethylene adipate of molecular weight of 1010 is used the preferred ratio is 2.06:1.00:1.06.

The ethylene-copolymers which can be used in accordance with the invention can be characterized in a general way as long-chain hydrocarbon backbones which are randomly and irregularly substituted with side chains which are no more than about three carbon atoms in length. More specifically, the polymers are copolymers of ethylene with terminally ethylenically unsaturated organic compounds containing 4–5 carbon atoms. The preferred comonomers are selected from the group consisting of esters of terminally ethylenically-unsaturated monocarboxylic acids and saturated aliphatic alcohols and esters of saturated monocarboxylic acids and terminally ethylenically-unsaturated aliphatic alcohols. Examples of such comonomers are unsaturated esters such as vinyl acetate, ethyl acrylate and methyl acrylate.

The ethylene-vinyl acetate copolymers which are to be used in the compositions of the invention correspond to the general formula

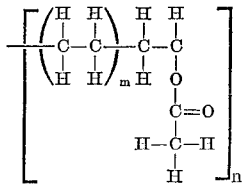

wherein $n$ ranges from about 15 to about 250. The actual occurrence of the acetate substituents along the hydrocarbon chain is of a random character and thus the letter $m$ denotes the average number of ethylene units per vinyl acetate unit in the molecule rather than the presence of regularly recurrent units having the composition given within the above brackets. The value for "$m$" ranges from about 6.5 to 40 and preferably from about 8 to 30. Typical properties of ethylene-vinyl acetate copolymer which may be used in the invention are as follows.

A corresponding family of ethylene-ethylacrylate type of copolymers may be utilized as well. In these, the comonomer is generally described as a terminally ethylenically unsaturated ester containing 4–5 carbon atoms, the ester being an unsaturated monocarboxylic acid esterified with a saturated aliphatic alcohol. Ethylacrylate and methacrylate are typical of this class. In both of these types of ethylene-ester copolymers, the ester comonomer is utilized in an amount between 8 and 33% by weight of ester unit based on the total copolymer preferably this is an amount between about 20 and 30% thereof. Physical properties of typical copolymers of this description are as follows:

ing polymers such as low molecular weight alphamethyl styrene polymers, resins such as coumarone-indene resins, fillers such as mineral particulate fillers including titanium dioxide, calcium carbonate and the like as well as carbon black and especially with mineral extending oils for the purpose of reducing the overall cost of the composition and alteration of the physical properties thereof. The effect of adding the subject classes of supplementary polymers to the block copolymer is noted regardless of the other components of the compositions which may be present. The working examples will also illustrate this point.

One of the unexpected features of the present invention was the finding that certain of these supplementary polymers, notably the polyester urethanes, resulted in transparent blends with the block copolymers, a feature which is especially useful where clear compositions are desired. Other polymers which may be blended with the block copolymers such as polyolefins and the like while improving certain physical properties of the block copolymers and altering other properties result in translucent or opaque blends therewith. One of the striking aspects of the compositions of this invention was finding that low

TABLE I.—PROPERTIES OF ETHYLENE-VINYL ACETATE COPOLYMERS

| | A | B | C | D | E | F | G | H | I | J |
|---|---|---|---|---|---|---|---|---|---|---|
| Weight percent vinyl acetate | 33 | 27–29 | 28 | 28 | 28 | 28 | 23 | 23 | 18 | 18 |
| $C_2^-$/vinyl acetate, mole ratio | 6.5/1 | | 8/1 | 8/1 | 8/1 | 8/1 | 10/1 | 10/1 | 14/1 | 14/1 |
| Melt index, grams/10 minutes | 25 | 125–175 | 100 | 15 | 25 | 15 | 400 | 100 | 2 | 150 |
| Molecular weight | 28,000 | | | | 28,000 | 33,000 | | | | |
| Softening point (R and B), °F | 243 | 192 | | 252 | 255 | 276 | | | | |
| Tensile strength, p.s.i | 1,000 | 460 | | 1,700 | 1,000 | 2,000 | | | | |
| Elongation at break, percent | 700 | 650 | | 800 | 700 | 750 | | | | |
| Density | 0.95 | 0.95 | | | 0.95 | 0.95 | | | | |

TABLE II.—PROPERTIES OF OTHER ETHYLENE COPOLYMERS

| Sample | Ethylene/ethyl acrylate copolymers | | Ethylene/methyl acrylate copolymers | |
|---|---|---|---|---|
| Weight percent comonomer | 20 | 30 | 17.4 | 23.6 |
| Melt index, grams/10 minutes | 18 | 18 | 3.5 | 6.6 |
| Molecular weight | 32,000 | | 41,000 | 38,000 |
| Tensile strength, p.s.i | 1,200 | 750 | 1,180 | 1,200 |
| Elongation at break, percent | 700 | 800 | 710 | 763 |
| Density | 0.927 | 0.932 | 0.942 | 0.947 |

The advantages of the present invention are gained by combining the block copolymer with the supplementary polymer under any desired type of procedure including solution blending, latex blending, extrusion blending, compression molding or other types of thermoforming operations which may result in either nibs or chips which are later to be used in forming articles of commercial or in the forming operation resulting in such articles. The alteration in physical properties willy differ in operations as extrusion depending on the applied shear relative to the axis of extrusion in which the testing is carried out. Data given in the working examples will illustrate this point.

melt indexes in the supplementary polymers, e.g., 1–5 melt index results in especially outstanding improvement in ozone resistance to the block copolymer blends.

The resistance to softening or absorption by oil is substantially improved by the presence of the supplementary polymers and, at equivalent hardness, the oil resistance of these blends is especially superior to corresponding blends of the block copolymers with polyolefins. Other benefits of the blends compared with the unmodified block copolymers include the improved resistance of molded articles to distortion and shrinkage at elevated temperatures.

The following examples illustrate the benefits gained by blending the subject block copolymers with a variety of the supplementary polymer.

EXAMPLE I

Blends of a typical block copolymer were made with several species of each of the three classes of supplementary polymers in accordance with the present invention. Table III below gives the typical set of physical properties for each of the individual polymers concerned.

TABLE III.—PROPERTIES OF POLYMERS

| Type [1] | EEA #1 | EEA #2 | EVA #1 | EVA #2 | EVA #3 | EVA #4 | PEU | SBS |
|---|---|---|---|---|---|---|---|---|
| $M_{300}$, p.s.i | 750 | 600 | 900 | 900 | 650 | 350 | 900 | 350 |
| $T_b$, p.s.i | 1,900 | 1,050 | 2,550 | 2,100 | 1,050 | 1,050 | 1,550 | 4,100 |
| $E_b$, percent | 740 | 700 | 700 | 720 | 760 | 800 | 380 | 900 |
| Set at break, percent | 530 | 500 | 580 | 560 | 520 | 75 | 75 | 15 |
| Shore A hardness | 82 | 86 | 85 | 90 | 82 | 73 | 75 | 65 |
| "E" melt index, grams/10 minutes | 1.9 | 23 | 1.3 | 6.8 | 3.5 | 22 | 94 | 1.8 |

[1] EEA=ethylene-ethyl acrylate copolymer, EVA=ethylene-vinyl acetate copolymer; PEU=polyester urethane; SBS=polystyrene-polybutadiene-polystyrene, block mol. wts: 9,500–47,000–9,500

The compositions of the invention may be modified with supplementary materials including monovinyl arene polymers such as polystyrene, low molecular weight plasticiz- Blends of the first seven polymers in Table III with the eighth (SBS) polymer were prepared and molded by compression molding, utilizing two different level of supplementary polymer in the compositions. Tables IV and V below summarize the physical properties of the blends so prepared.

The ethylene-vinyl acetate copolymer utilized for all of the above compounds was the same as EVA-1 given in Table III above.

TABLE IV.—PROPERTIES OF BLENDS AT THE 20 phr. LEVEL COMPARED WITH BASE POLYMER

| Type | EEA #1 | EEA #2 | EVA #1 | EVA #2 | EVA #3 | EVA #4 | PEU | SBS base polymer |
|---|---|---|---|---|---|---|---|---|
| Additive properties: | | | | | | | | |
| Shore A hardness | 82 | 86 | 85 | 90 | 82 | 74 | 75 | |
| "E" melt index, grams/10 minutes | 1.9 | 23 | 1.3 | 6.8 | 3.5 | 22 | 94 | |
| Blend properties: | | | | | | | | |
| $M_{300}$, p.s.i | 500 | 400 | 500 | 400 | 450 | 350 | 400 | 325 |
| $T_b$, p.s.i | 3,350 | 3,150 | 3,150 | 3,400 | 3,600 | 2,850 | 3,000 | 4,300 |
| $E_b$, percent | 940 | 920 | 860 | 920 | 900 | 900 | 900 | 900 |
| Set, percent | 40 | 30 | 40 | 40 | 30 | 25 | 25 | 20 |
| $E_b$/Set | 23 | 31 | 22 | 23 | 30 | 36 | 36 | 45 |
| Shore A hardness | 69 | 68 | 70 | 65 | 64 | 65 | 67 | 64 |
| Melt index | 1.4 | 2.2 | | 1.9 | | 2.6 | 1.9 | 1.8 |
| Ozone resistance hours to Crack: | | | | | | | | |
| Rating [1] of— | | | | | | | | |
| 8 | 2.2 | 1.4 | >500 | 2.3 | 3.4 | 2.5 | 1.5 | 2 |
| 5 | 9 | 6 | >500 | 7.5 | 9 | 8.5 | 6 | 6 |
| 2 | 30 | 26 | >500 | 26 | 23 | 32 | 25 | 18 |
| Percent absorption of mineral white oil [2] | 360 | 370 | | 340 | 480 | | 420 | 510 |

[1] After exposure to 50 pphr. ozone at a temperature of 90° F.
[2] After soaking rheometer extrudate (extruded at 135 sec.$^{-1}$) for 100 hours at 23° C.

TABLE V.—PROPERTIES OF BLENDS AT THE 50 phr. LEVEL COMPARED WITH BASE POLYMER

| Type | EEA #1 | EEA #2 | EVA #1 | EVA #2 | EVA #3 | EVA #4 | PEU | SBS base polymer |
|---|---|---|---|---|---|---|---|---|
| Additive properties: | | | | | | | | |
| Shore A hardness | 82 | 86 | 85 | 90 | 82 | 73 | 75 | |
| "E" melt index, grams/10 minutes | 1.9 | 23 | 1.3 | 6.8 | 3.5 | 22 | 94 | |
| Blend Properties: | | | | | | | | |
| $M_{300}$, p.s.i | 600 | 500 | 500 | 550 | 450 | 400 | 500 | 325 |
| $T_b$, p.s.i | 2,100 | 2,400 | 2,750 | 2,400 | 2,400 | 2,250 | 1,600 | 4,300 |
| $E_b$, percent | 800 | 880 | 820 | 760 | 860 | 900 | 700 | 900 |
| Set, percent | 70 | 75 | 75 | 75 | 65 | 40 | 20 | 20 |
| Shore A hardness | 73 | 70 | 74 | 74 | 73 | 67 | 71 | 64 |
| $E_b$/Set | | | | | | | | |
| "E" melt index, grams/10 minutes | 1.6 | 3.1 | | 2.5 | | 6.0 | 7.6 | 1.8 |
| Ozone resistance hours to crack rating of: | | | | | | | | |
| 8 | 16 | 3 | >500 | 5 | >500 | 2.4 | 1.8 | 2 |
| 5 | 80 | 9 | >500 | 30 | >500 | 9.0 | >500 | 6 |
| 2 | 160 | 30 | >500 | 110 | >500 | 32 | >500 | 18 |
| Percent absorption of mineral white oil | 160 | 170 | | 160 | | 270 | 250 | 510 |

Similar blends with polyethylene and block polymer showed that the present classes of supplementary polymers result in blends which are softer, stronger and more rubbery than the corresponding polyethylene-block polymer blends.

EXAMPLE II

In order to demonstrate that improved physical properties particularly relative to improved cut growth resistance, ozone resistance and solvent resistance are obtained even though other compound components are present, the following tests were performed. The block copolymer employed in the base compound was polystyrene-polybutadiene-polystyrene having block molecular weights of 23,000–41,000–23,000. Table VI below presents the results obtained in comparison with the base compound from which the supplementary polymer was omitted.

The base compound when tested for flexing in a standard flex test (ASTM D-1052-55) fell to a low rating after about 100,000 flexes. However, when the base compound was modified with the subject ethylene-vinyl acetate copolymer in an amount of 45 phr. based on the block copolymer the flexing to the same rating required over 500,000 flexes.

EXAMPLE III

The improvement in tear resistance of the compositions of this invention compared with the basic block copolymer in a suitable compounded stock was tested by means of mixing in ethylene vinyl acetate copolymer using injection molding as the mixing technique. The supplementary polymer was identical wtih EVA-1 described in Table VI above. Table VII which follows presents the data obtained on the blends so prepared. The data of spe-

TABLE VI.—FORMULATIONS AND PROPERTIES OF EVA COMPOUNDS

| | Base compound | EVA-1 | EVA-2 | EVA-3 | EVA-4 | EVA-5 | EVA-6 | EVA-7 |
|---|---|---|---|---|---|---|---|---|
| SBS block polymers | 100 | 100 | 100 | 100 | 100 | 100 | 100 | 100 |
| EVA-1 | 0 | 25 | 35 | 45 | 45 | 45 | 45 | 45 |
| Oil | 107 | 107 | 107 | 107 | 107 | 107 | 107 | 122 |
| Polystyrene | 60 | 60 | 60 | 60 | 40 | 30 | 20 | 60 |
| $CaCO_3$ | 75 | 75 | 75 | 75 | | | | |
| $TiO_2$ | 10 | 10 | 10 | 10 | 10 | 10 | 10 | 10 |
| Specific gravity | | | | | .973 | .970 | .967 | .973 |
| Melt flow condition (E), grams/10 minutes | 43.9 | 17.8 | 18.6 | 18.2 | 16 | 24.8 | 26.7 | 33.3 |
| Hardness, (milled sheet) | 41 | 62 | 67 | 60 | 53 | 52 | 50 | 51 |
| Angle tear, p.l.i. (compression molded) | 120 | 159 | 169 | 149 | 149 | 129 | 115 | 133 | cial interest is that described as angle tear which indicates the improved tear resistance effected by the presence of the ethylene-vinyl acetate copolymer.

TABLE VII.—COMPOSITION AND PHYSICAL PROPERTIES OF BLENDS OF BLOCK COPOLYMER WITH EVA, MIXED DURING INJECTION MOLDING

| (A) Composition: | | | | |
|---|---|---|---|---|
| Parts block copolymer compound [1] | 100 | | 100 | 100 |
| Parts EVA | 0 | | 25 | 50 |
| (B) Properties, on injection molded sheets: | | | | |
| Tensile at break, p.s.i. | N | 575 | N 675 | N 1,000 |
| | P | 525 | P 625 | P 700 |
| Elongation at break, percent | N | 700 | N 500 | N 725 |
| | P | 300 | P 320 | P 325 |
| 300% modulus, p.s.i. | N | 300 | N 620 | N 700 |
| | P | 525 | P 525 | P 550 |
| Set at break, percent | N | 20 | N 50 | N 135 |
| | P | 5 | P 25 | P 50 |
| Flexural modulus, p.s.i. | N | 310 | N 345 | N 1,050 |
| | P | 540 | P 480 | P 1,000 |
| Angle tear, p.l.i. | N | 110 | N 150 | N 185 |
| | P | 130 | P 170 | P 215 |
| Shore A hardness | | 45 | 58 | 67 |

[1] Compound.—Block copolymer: polystyrene-polybutadiene-polystyrene, 46 parts by weight; Mineral Oil, 70 parts by weight; Polystyrene, 33 parts by weight; CaCO$_3$, 15 parts by weight.

NOTE.—Test direction normal (N) or parallel (P) to flox during inection molding.

EXAMPLE IV

The effect of ethylene-vinyl acetate copolymer on the ozone resistance and flex life was investigated, using the same block copolymer compound and EVA described in the preceding example. Table VIII shows the great improvement in these properties in comparison with the control sample, which contained no EVA.

TABLE VIII.—OZONE AND FLEX RESISTANCE OF BLENDS OF BLOCK COPOLYMER WITH EVA

| | | | |
|---|---|---|---|
| Block copolymer compound, parts | 100 | 100 | 100 |
| EVA, parts | None | 25 | 50 |
| (A.) Ozone resistance, static, 50 p.p.h.m. ozone at ~90° F.: | | | |
| Injection molded flex bars, (bent parallel to flow); Hours exposure to give a rating [1] of: | | | |
| 8 | 30 | >300 | >300 |
| 5 | 120 | >300 | >300 |
| 2 | 250 | >300 | >300 |
| (B.) Flex resistance: | | | |
| Injection molded flex bars; Kilocycles flex to give a rating of, unpierced samples: | | | |
| 8 | 30 | >1,000 | >1,000 |
| 5 | 100 | >1,000 | >1,000 |
| 2 | 170 | >1,000 | >1,000 |
| Cut growth rate, kilocycles flex/in. pierced samples | 150 | 700 | 8,000 |

[1] 10=unchanged; 0=completely broken.

I claim as my invention:

1. A mechanical blend comprising
   (a) a block copolymer having a general configuration $$A(B-A)_{1-5}$$

wherein each A is a polymer block of a monovinyl arene, said block having an average molecular weight between 8,000 and 45,000 and B is a polymer block of a conjugated diene, said block having an average molecular weight between 35,000 and 150,000; and
   (b) 10 to 150 parts by weight per 100 parts by weight of the block copolymer of essentially linear elastomeric polyester urethanes, comprising the reaction product obtained by heating a mixture comprising as essential polyester urethane forming ingredients (1) one mol of an essentially linear hydroxyl terminated polyester of a saturated, aliphatic glycol having from 4 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 mols of a diphenyl diisocyanate having an isocyanate group on each phenyl nucleus in the presence of (3) from about 0.1 to 2.1 mols of a saturated, aliphatic free glycol containing from 4 to 10 carbon atoms and having hydroxyl groups on its terminal carbon atoms, the molar amount of said free glycol combined being essentially equivalent to the molar amount of said diphenyl diisocyanate whereby there are essentially no unreacted groups of the class consisting of isocyanate and hydroxyl groups in said reaction product.

2. A blend according claim 1 wherein the block copolymer has the general configuration polystyrene-polybutadiene-polystyrene.

3. A blend according to claim 2 wherein the supplementary polymer is a polyester urethane.

4. A blend according to claim 1 wherein the block copolymer has the configuration A—B—A.

5. A blend according to claim 1 wherein the block copolymer is polystyrene-polyisoprene-polystyrene.

References Cited

UNITED STATES PATENTS

| | | | |
|---|---|---|---|
| 3,231,635 | 1/1966 | Holden | 260—880 |
| 3,239,478 | 3/1966 | Harlan | 260—880 |
| 3,265,765 | 8/1966 | Holden | 260—880 |
| 3,322,856 | 5/1967 | Holden | 260—880 |
| 3,333,024 | 7/1967 | Haefele | 260—880 |
| 3,390,207 | 6/1968 | Moss | 260—880 |
| 3,441,530 | 4/1969 | Bauer | 260—880 |
| 3,459,700 | 8/1969 | Richards | 260—880 |
| 3,299,174 | 1/1967 | Kuhre | 260—876 |
| 3,424,649 | 1/1969 | Nyberg | 260—876 |
| 3,459,830 | 8/1969 | Legge | 260—876 |
| 3,459,831 | 8/1969 | Luftglass | 260—876 |
| 3,458,600 | 7/1969 | Mann | 260—859 |

PAUL LIEBERMAN, Primary Examiner

U.S. Cl. X.R.

260—37, 41, 41.5, 75, 85.7, 86.7, 829, 876, 880